US009813636B2

(12) United States Patent
Chen

(10) Patent No.: US 9,813,636 B2
(45) Date of Patent: Nov. 7, 2017

(54) PROCESSOR AND APPARATUS CAPABLE OF REDUCING IMAGE FLICKER AND A RELATED METHOD

(71) Applicant: MediaTek Inc., Hsin-Chu (TW)

(72) Inventor: Yu-Sheng Chen, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 6 days.

(21) Appl. No.: 14/808,079

(22) Filed: Jul. 24, 2015

(65) Prior Publication Data

US 2017/0026803 A1    Jan. 26, 2017

(51) Int. Cl.
*H04N 5/235* (2006.01)
*H04W 4/02* (2009.01)
*H04N 7/12* (2006.01)
*H04W 52/02* (2009.01)

(52) U.S. Cl.
CPC ......... *H04N 5/2357* (2013.01); *H04N 5/2353* (2013.01); *H04W 4/028* (2013.01); *H04W 52/0229* (2013.01); *Y02B 60/50* (2013.01)

(58) Field of Classification Search
None
See application file for complete search history.

(56) References Cited

U.S. PATENT DOCUMENTS

| 5,894,330 | A | 4/1999 | Huang et al. |
| 6,970,207 | B1 | 11/2005 | Seigneret et al. |
| 7,881,552 | B1 | 2/2011 | Gerber et al. |
| 8,068,148 | B2 | 11/2011 | Noyes et al. |
| 8,648,929 | B2 | 2/2014 | Ho et al. |
| 8,736,711 | B2 | 5/2014 | Chen |
| 2005/0136974 | A1* | 6/2005 | Ho ......................... G03B 29/00 455/556.1 |
| 2005/0237394 | A1 | 10/2005 | Katiblan et al. |

(Continued)

FOREIGN PATENT DOCUMENTS

| CN | 103228087 | 7/2013 |
| CN | 203327320 | 12/2013 |
| WO | WO 2013/074913 | 5/2013 |

OTHER PUBLICATIONS

"Camera.Parameters;" download from website of Android Developers; Jul. 23, 2015; pp. 1-46.

(Continued)

*Primary Examiner* — Mark T Monk
(74) *Attorney, Agent, or Firm* — McClure & Qualey & Rodack, LLP

(57) ABSTRACT

An apparatus capable of reducing image flicker, including: a processor and an image capture device. The processor is configured to: detect whether a telecom operator is currently offering a telecommunication service to the apparatus; search a mapping history of utility frequencies from a storage device and determine whether the telecom operator is mapped to a utility frequency after detecting that the telecom operator is currently offering a telecommunication service to the apparatus; and obtain the utility frequency mapped to the telecom operator from the mapping history to be a current utility frequency after determining the utility frequency mapped to the telecom operator. The image capture device, coupled to the processor, is configured to operate with an exposure time adjusted according to the current utility frequency.

18 Claims, 4 Drawing Sheets

(56) References Cited

U.S. PATENT DOCUMENTS

2007/0023497 A1* 2/2007 Chuang .................. H04H 60/51
235/375
2011/0255786 A1* 10/2011 Hunter .................... H04N 5/21
382/190
2013/0169747 A1 7/2013 Gerber et al.

OTHER PUBLICATIONS

"Displaying a Location Address;" download from website of Android Developers; Jul. 23, 2015; pp. 1-9.
"How to find out carrier's name in Android;" download from website of Stack Overflow; Jul. 23, 2015; pp. 1-2.
"TelephonyManager;" download from website of Android Developers; Jul. 23, 2015; pp. 1-25.
"Utility frequency;" download from website of Wikipedia; Jul. 23, 2015; pp. 1-12.

* cited by examiner

PROCESSOR AND APPARATUS CAPABLE OF REDUCING IMAGE FLICKER AND A RELATED METHOD

BACKGROUND OF THE INVENTION

Field of the Invention

Aspects of the present invention relate generally to a processor and an apparatus capable of reducing image flicker and a related method and, more particularly, to a processor and an apparatus capable of reducing image flicker by performing a mapping between utility frequencies and telecom operators and a related method.

Description of the Related Art

Image capture devices, such as digital video cameras or digital still photo cameras, are used in different applications and environments. An image capture device should be capable of producing high-quality imagery under a variety of lighting conditions. For example, image capture devices should be capable of operating effectively in environments illuminated by natural light, such as outdoor environments, as well as in environments illuminated by incandescent or fluorescent lights, such as indoor environments.

In an indoor environment, however, fluctuations in the intensity of indoor lighting can degrade the quality of the captured image. The fluctuations are a function of the alternating current (AC) electrical power frequency of the indoor lighting source, which is the so-called utility frequency. A solid state image capture device, such as a complementary metal oxide semiconductor (CMOS) device, includes an array of image sensors that do not instantaneously capture all of the image information used to record a frame. Consequently, fluctuations in light intensity during image capture cause portions of an image frame to exhibit different intensity levels, resulting in visible bands in the image. This banding phenomenon is commonly referred to as flicker. Variations in the AC power frequency of indoor lighting or utility frequency exist throughout the world. Some countries use 60 Hertz (Hz) power, for example, while other countries use 50 Hz power. A 60 Hz illumination source causes banding at 120 Hz, while a 50 Hz illumination source causes banding at 100 Hz.

Flicker may be eliminated by setting an exposure time of the image capture device to an integer multiple of the period of the illumination source or a utility frequency. The exposure time may refer to the time limit for the sensor array to capture light for each frame. In other words, to reduce the image flicker, a current utility frequency f is detected first, and an image sensor exposure time can be adjusted to be a multiple of 1/2f.

Most mobile apparatuses use an image-based detection algorithm to detect the current utility frequency. However, most people only leave their own country 1 or 2 times a year. A lot of CPU computing power of the mobile apparatus may be wasted on detecting the current utility frequency by using the image-based detection algorithm even when the user is not traveling to a new region. Thus, there is a need to develop an apparatus and a related method for detecting utility frequency and reducing image flicker.

BRIEF SUMMARY OF THE INVENTION

A processor and an apparatus capable of reducing image flicker and a related method are provided.

A processor and an apparatus for capable of reducing image flicker and a related method are provided.

In a preferred embodiment, the invention is directed to an apparatus capable of reducing image flicker. The apparatus comprises a processor and an image capture device. The processor is configured to: detect whether a telecom operator is currently offering a telecommunication service to the apparatus; search a mapping history of utility frequencies from a storage device and determine whether the telecom operator is mapped to a utility frequency after detecting that the telecom operator is currently offering a telecommunication service to the apparatus; obtain the utility frequency mapped to the telecom operator from the mapping history to be a current utility frequency after determining the utility frequency mapped to the telecom operator. The image capture device, coupled to the processor, is configured to operate with an exposure time adjusted according to the current utility frequency.

In some embodiments of the apparatus, the mapping history records mapping relationships between one or more telecom operators and one or more utility frequencies. In some embodiments of the apparatus, the processor is further configured to obtain the current utility frequency by one or more other resources after detecting that no telecom operator is currently offering a telecommunication service to the apparatus. In some embodiments of the apparatus, the processor is further configured to: update the mapping history by recording a telecom operator to be mapped to the current utility frequency obtained by the one or more other resources if it is later detected the telecom operator offers a telecommunication service to the apparatus.

In some embodiments of the apparatus, the processor is further configured to: obtain the current frequency by one or more other resources after detecting that no utility frequency is mapped to the telecom operator. In some embodiments of the apparatus, the processor is further configured to: update the mapping history by recording the telecom operator to be mapped to the current utility frequency obtained by the one or more other resources.

In some embodiments of the apparatus, the step of obtaining the current utility frequency by one or more other resources comprises any of performing an image-based detection algorithm, using a Global Positioning System (GPS) signal received by the apparatus and a location-frequency mapping table, wherein the location-frequency mapping table records mapping relationships between locations and utility frequencies, analyzing a frequency spectrum of a DC charging circuit of the apparatus to obtain the current utility frequency, using user manual settings to obtain the current utility frequency, and querying from one or more online servers or a nearby apparatus near the apparatus to obtain the current utility frequency.

In a preferred embodiment, the invention is directed to a processor for use in an apparatus capable of capturing images, having capability to reduce image flicker, comprising: a detecting unit, configured to detect whether a telecom operator is currently offering a telecommunication service to the apparatus; a searching unit, configured to search a mapping history of utility frequencies from a storage device and determine whether the telecom operator is mapped to a utility frequency after detecting that the telecom operator is currently offering a telecommunication service to the apparatus, and obtain the utility frequency mapped to the telecom operator from the mapping history to be a current utility frequency after determining the utility frequency mapped to the telecom operator; and an adjusting unit, configured to adjust an exposure time for capturing images according to the current utility frequency.

In a preferred embodiment, the invention is directed to a method for reducing image flicker of an apparatus capable of capturing images, the method comprises: detecting whether a telecom operator is currently offering a telecommunication service to the apparatus; searching a mapping history of utility frequencies from a storage device and determining whether the telecom operator is mapped a utility frequency after detecting that the telecom operator to be currently offering the telecommunication service to the apparatus; obtaining the utility frequency mapped to the telecom operator from the mapping history to be a current utility frequency after determining the utility frequency is mapped to the telecom operator; and adjusting an exposure time for capturing images according to the current utility frequency.

In some embodiments of the method, the mapping history records mapping relationships between one or more telecom operators and one or more utility frequencies. In some embodiments of the method, the method further comprises obtaining the current utility frequency by one or more other resources after detecting that no telecom operator is currently offering a telecommunication service to the apparatus. In some embodiments of the method, the method further comprises updating the mapping history by recording a telecom operator to be mapped to the current utility frequency obtained by the one or more other resources if it is later detected that the telecom operator offers a telecommunication service to the apparatus.

In some embodiments of the method, the method further comprises obtaining the current frequency by one or more other resources after detecting that no utility frequency is mapped to the telecom operator. In some embodiments of the method, the method further comprises updating the mapping history by recording the telecom operator to be mapped to the current utility frequency obtained by the one or more other resources.

In some embodiments of the method, the step of obtaining the current utility frequency by one or more other resources comprises any of performing an image-based detection algorithm, using a Global Positioning System (GPS) signal received by the apparatus and a location-frequency mapping table, wherein the location-frequency mapping table records mapping relationships between locations and utility frequencies, analyzing a frequency spectrum of a DC charging circuit of the apparatus to obtain the current utility frequency, using user manual settings to obtain the current utility frequency, and querying from one or more online servers or a nearby apparatus near the apparatus to obtain the current utility frequency.

In a preferred embodiment, the invention is directed to a method for reducing image flicker of an apparatus capable of capturing images. The method comprises detecting whether a telecom operator is currently offering a telecommunication service to the apparatus; and in events where a telecom operator is detected to be currently offering a telecommunication service to the apparatus, obtaining a utility frequency mapped to the telecom operator from previously-stored mapping formation, wherein the utility frequency is provided for adjusting an exposure time of an image capturing device according to the utility frequency.

Then apparatus for reducing image flicker and a related method according to the embodiments of the present invention are capable of automatically mapping the utility frequency of an image capture device of an apparatus to a telecom operator which the apparatus has been connected to. Accordingly, compared to continuously detecting the utility frequency by an image-based detection algorithm, the apparatus and the related method can save more computing power.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
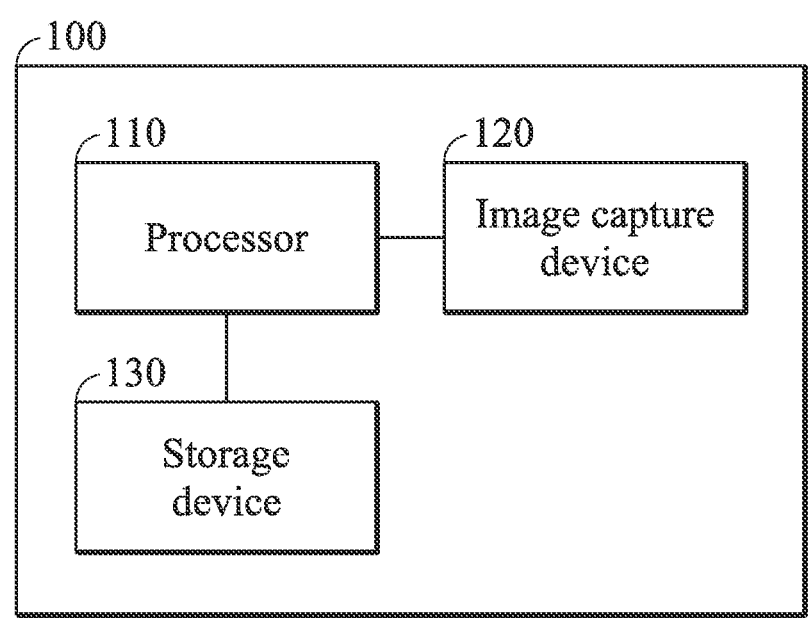
FIG. 1 is a block diagram illustrating an apparatus capable of reducing image flicker according to an embodiment of the present invention.

Several exemplary embodiments of the present disclosure are described with reference to FIGS. 1 through 3, which generally relate to an apparatus capable of detecting a utility frequency and reducing image flicker and a related method. It should be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

FIG. 1 is a block diagram illustrating an apparatus 100 that reduces image flicker according to an embodiment of the present invention. As shown in FIG. 1, the apparatus 100 includes a processor 110, an image capture device 120, and a storage device 130.

The apparatus 100 according to an exemplary embodiment of the present invention can be any one of the many types of information processing devices, multimedia devices, and their equivalents. For example, the apparatus 100 may be any portable device including a mobile communication apparatus operating on the communication protocols supported by the corresponding mobile communication systems, a Portable Multimedia Player (PMP), a digital broadcast player, a Personal Digital Assistant (PDA), a music player (e.g., an MP3 player), a portable game console, or a smartphone. Also, the method of detecting flickering utility frequency according to an exemplary embodiment of the present invention may be applied to large and medium-sized devices such as a Television (TV), a Large Format Display (LFD), Digital Signage (DS), a media pole, a Personal Computer (PC), and a laptop computer.

The features illustrated in FIG. 1 may be realized by any suitable combination of hardware and/or software components. The processor 110 may be configured by any form including: software to be executed on any suitable processor such as a central processing unit (CPU); a dedicated processor such as a digital signal processor (DSP) that specializes in performing each process; and hard logic.

The image capture device 120 can capture a picture of an object and transfers image/video data corresponding to the picture to the processor 110. The image capture device 120 can convert light input (i.e., an optical signal) through a camera lens into digital data by means of a sensor. The image capture device 120 may include a camera sensor (not illustrated) for converting the input optical signal into an electrical signal and a signal processor for converting the electrical signal input from the camera sensor into a digital signal. The camera sensor may be implemented with a Charge-Coupled Device (CCD) or a Complementary Metal-Oxide-Semiconductor (CMOS). More particularly, the image capture device 120 can take pictures and the processor can then eliminate image flicker for the pictures according to a detected utility frequency.

The storage device 130 stores data and various application programs runnable in the apparatus 100 and may include at least one of a volatile memory device and a nonvolatile memory device. For example, the storage device 130 may permanently or temporarily store the Operating System (OS) of the apparatus 100, and application programs and data related to control of the image capture device 120. The storage device 130 may permanently or temporarily include storage regions for storing one or more utility frequencies corresponding to one or more telecom operators, e.g., in a form of a mapping history.

Although they are not shown, the apparatus 100 may further comprise other functional devices, such as a Radio Frequency (RF) unit and a Baseband unit for wireless communications, and/or an Input/Output (I/O) device (e.g., a button, keyboard, mouse, or touch pad, etc.), and the invention is not limited thereto. In one embodiment, if the apparatus 100 is a mobile phone or a smartphone, the Baseband unit therein may contain multiple hardware devices to perform baseband signal processing, including ADC/DAC, gain adjusting, modulation/demodulation, encoding/decoding, and so on, while the RF unit therein may receive RF wireless signals, convert the received RF wireless signals to baseband signals, which are processed by the Baseband unit, or receive baseband signals from the baseband unit and convert the received baseband signals to RF wireless signals, which are transmitted later. The RF unit may also contain multiple hardware devices to perform radio frequency conversion, such as a mixer for multiplying the baseband signals with a carrier oscillated in the radio frequency of the wireless technology, wherein the radio frequency may be 900 GHz, 1800 GHz, or 1900 GHz utilized in the Global System for Mobile communications (GSM) technology, or may be 900 GHz, 1900 GHz, or 2100 GHz utilized in the Wideband Code Division Multiple Access (WCDMA) technology, or others depending on the wireless technology in use.

Figure 2:
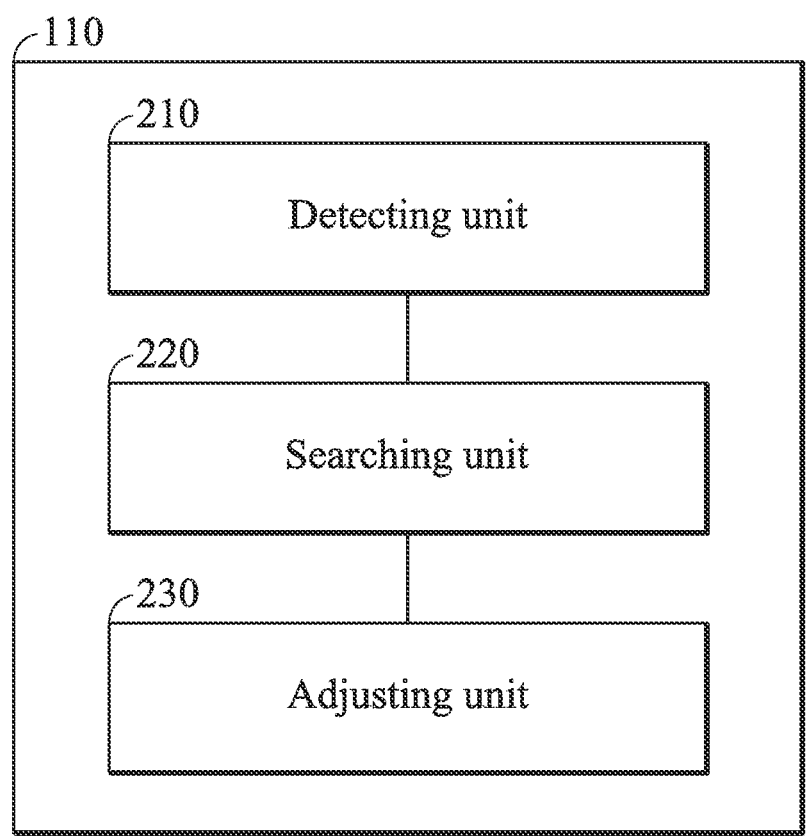
FIG. 2 is a block diagram illustrating a processor 110 capable of reducing image flicker according to an embodiment of the present invention.

FIG. 2 is a block diagram illustrating a processor 110 capable of reducing image flicker according to an embodiment of the present invention. The processor 110 can be implemented in an apparatus capable of capturing images, e.g., the apparatus 100 capable of capturing images with reference to FIG. 1. As shown in FIG. 2, the processor 110 includes a detecting unit 210, a searching unit 220, and an adjusting unit 230, each of which can be implemented hardware, software, or a combination of both. The detecting unit 210 can detect whether a telecom operator is currently offering a telecommunication service to the apparatus. The searching unit 220 can search a mapping history of utility frequencies which may be fetched from a storage device, and the searching unit 220 can determine whether the telecom operator is mapped to a utility frequency after detecting that the telecom operator is currently offering a telecommunication service to the apparatus, and can obtain the utility frequency mapped to the telecom operator from the mapping history to be a current utility frequency after determining the utility frequency mapped to the telecom operator. The adjusting unit 230 can adjust an exposure time for capturing images according to the current utility frequency.

Figure 3:
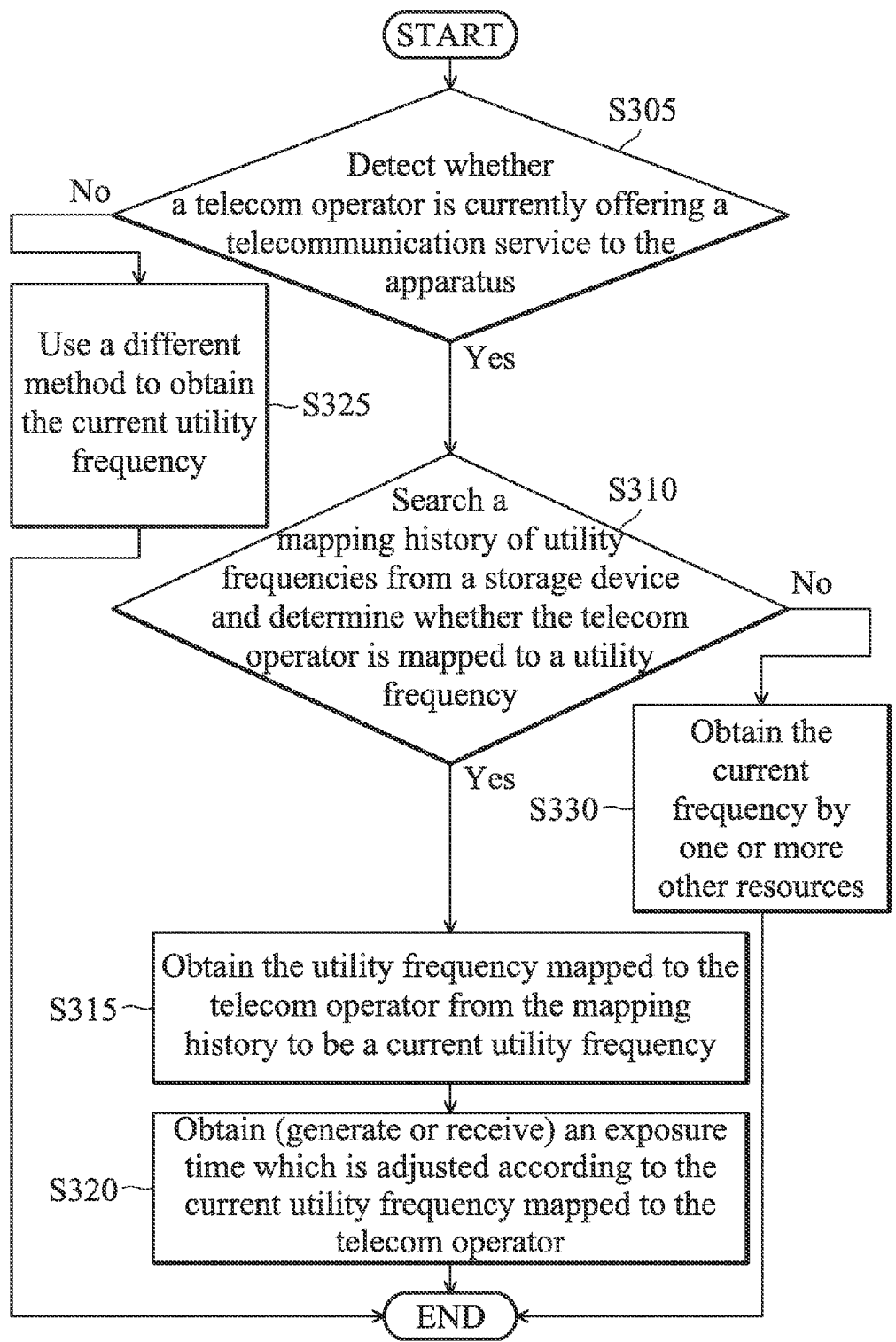
FIG. 3 is a flow chart of a process illustrating the method for detecting a utility frequency and reducing image flicker of an apparatus according to an embodiment of the invention with reference to the apparatus in FIG. 1.

FIG. 3 is a flow chart 300 of a process illustrating the method for detecting a utility frequency and reducing image flicker of an apparatus according to an embodiment of the invention with reference to the apparatus in FIG. 1.

Referring to FIG. 3, in step S305, the processor 110 can detect whether a telecom operator is currently offering a telecommunication service to the apparatus. After detecting that the telecom operator to be currently offering the telecommunication service to the apparatus ("Yes" in step S305), in step S310, the processor 110 can search a mapping history of utility frequencies from a storage device and determines whether the telecom operator is mapped to any utility frequency. Here, the mapping history of utility frequencies stored in the storage device may be managed and saved as a look-up table exemplary shown in Table 1.

TABLE 1

| Telecom operator | Utility frequency |
| --- | --- |
| Telecom operator A | 60 Hz |
| Telecom operator B | 50 Hz |
| Telecom operator C | 60 Hz |
| Telecom operator D | 50 Hz |

As shown in Table 1, different telecom operators can be mapped to different utility frequencies, respectively. For example, telecom operator A uses a utility frequency of 60 Hz, telecom operator B uses a utility frequency of 50 Hz, telecom operator C uses 60 Hz, and telecom operator D uses 50 Hz.

Back to FIG. 3. After determining that the utility frequency is mapped to the telecom operator ("Yes" in step S310), in step S315, the processor 110 obtains the utility frequency mapped to the telecom operator from the mapping history to be a current utility frequency. Next, in step S320, the image capture device 120 can obtain (generate or receive) an exposure time which is adjusted according to the current utility frequency mapped to the telecom operator. For example, the exposure time can be adjusted to be a multiple of 1/2f, where f denotes the current utility frequency.

If the processor 110 detects that no telecom operator is currently offering the telecommunication service to the apparatus ("No" in step S305), in step S325, the processor 110 may use a different method to obtain the current utility frequency. In other words, the processor 110 obtains the current frequency by one or more other resources. In some other embodiments, the processor may employ any one or more specific resource. In some other embodiments, the processor may dynamically select one of a plurality of resources to obtain the utility frequency.

Similarly, subsequent to step S310, if the processor 110 determines that no utility frequency is mapped to the telecom operator ("No" in step S310), in step S330, the processor 110 obtains the current frequency by one or more other resources. In some embodiments, the processor may select one of a plurality of resources to obtain the utility frequency.

It should be noted that the processor 110 may update the mapping history by recording the telecom operator to be mapped to the current utility frequency obtained by the one or more other resources after step S330. Therefore, even if the processor 110 cannot obtain the current utility frequency from the history mapping history, it can obtain the current utility frequency by one or more other resources and then update the mapping history for future use.

Similarly, after S325 where the utility frequency is obtained by any resources, if the apparatus is later detected to be offered telecommunication services by any telecom operator in the same location, the apparatus can update the mapping history by mapping the current utility frequency obtained by one or more other resources to the later connected telecom operator. Therefore, even if the processor 110 is not detected to connect any telecom operator, it can obtain the current utility frequency by one or more other resources, and then if the apparatus is later detected to connect to any telecom operator, the processor 110 can update the mapping history, which can be used in the future.

The one or more other resources used in step S325/S330 may include at least one of:

performing an image-based detection algorithm;

using a Global Positioning System (GPS) signal received by the apparatus and a location-frequency mapping table, wherein the location-frequency mapping table records mapping relationships between locations and utility frequencies;

analyzing a frequency spectrum of a DC charging circuit of the apparatus 100 to obtain the current utility frequency;

using user manual settings to obtain the current utility frequency; and querying from one or more online servers or a nearby apparatus near the apparatus to obtain the current utility frequency.

In one embodiment where the processor 110 obtains the current frequency by performing an image-based detection algorithm in step S325/S330, the processor 110 may obtain one or more images by using a predetermined exposure time. Then, the processor 110 performs the image-based detection algorithm to detect a pattern of the images and thereby obtains the current utility frequency. In another embodiment, the processor 110 may perform the image-based detection algorithm for a predetermined time to obtain a stable current utility frequency, and updates the storage device by recording the telecom operator to be mapped to the stable current utility frequency. In another embodiment, the processor 110 stops performing the image based detection algorithm after performing the image-based detection algorithm for the predetermined time to obtain the stable current utility frequency.

In one embodiment where the processor 110 obtains the current frequency by using the GPS signal received by the apparatus 100 and the location-frequency mapping table in step S325/S330, the location-frequency mapping table may be stored in the storage device 130, managed and saved in a table format as shown in Table 2.

TABLE 2

| Location information | Utility frequency |
|---|---|
| Taiwan | 60 Hz |
| Australia | 50 Hz |

As shown in Table 2, the location information of the apparatus 100 can be a geographical region (i.e., a country) and mapped to the utility frequency of the region. For example, the utility frequency of 60 Hz is used in Taiwan, and the utility frequency of 50 Hz is used in Australia.

In a preferred embodiment, a method is disclosed for reducing image flicker of an apparatus capable of capturing images. The method can include detecting whether a telecom operator is currently offering a telecommunication service to the apparatus; and in events where a telecom operator is detected to be currently offering a telecommunication service to the apparatus, obtaining a utility frequency mapped to the telecom operator from previously-stored mapping formation. The previously-stored mapping information can be a mapping table stored in a storage device. The mapping information can also be from any resources available to directly or indirectly provide mapping relation between one or more telecom operators and one or more utility frequencies. The mapping information can be further updated using a utility frequency obtained by one or more other resources different from the mapping information. The utility frequency can be provided for adjusting an exposure time of an image capturing device according to the utility frequency or any applications.

Figure 4:
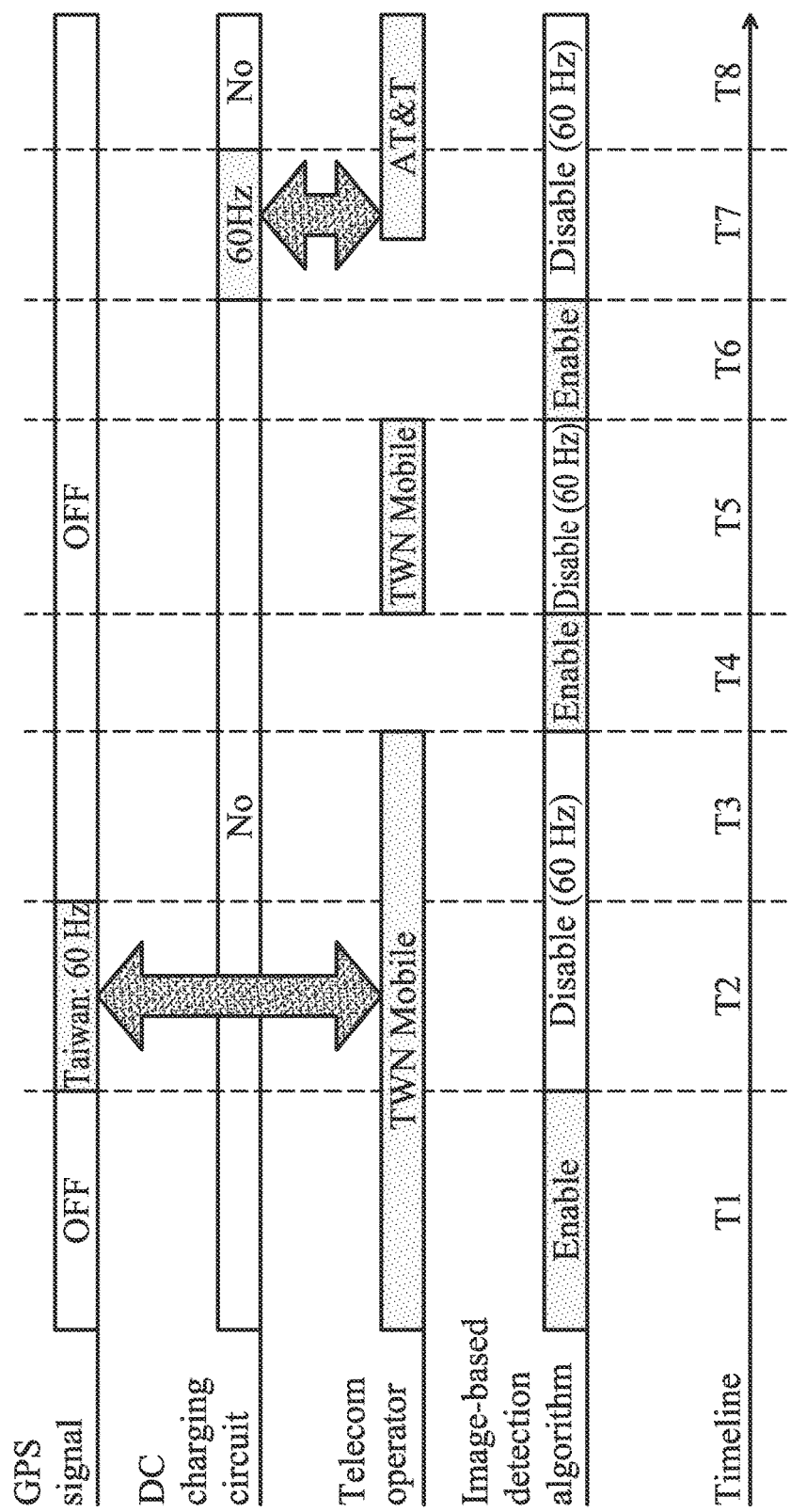
FIG. 4 is a timing diagram illustrating the procedure by which the apparatus constructs a mapping history according to an embodiment of the present invention.

FIG. 4 is a timing diagram illustrating the procedure by which the apparatus constructs a mapping history according to an embodiment of the present invention. As shown in FIG. 4, in time interval T1, the apparatus detects that a telecom operator, TWN Mobile, is currently offering telecommunications services to the apparatus. Then, the apparatus searches a mapping history of utility frequencies from a storage device. However, the apparatus detects that no utility frequency is currently offering the telecommunication service, TWN Mobile and does not have any GPS signal or frequency spectrum of a DC charging circuit of the apparatus. Therefore, in time interval T1, the apparatus uses an image-based detection algorithm to obtain the current utility frequency.

Next, in time interval T2, the apparatus receives a GPS signal and obtains the current utility frequency 60 Hz mapped to TWN Mobile according to the location-frequency mapping table. The apparatus can stop performing the image based detection algorithm and update the mapping history by recording TWN Mobile to the current utility frequency, 60 Hz.

The apparatus still uses the current utility frequency in time interval T3 until the apparatus is disconnected with TWN Mobile. Thus, the apparatus uses the image-based detection algorithm to obtain the current utility frequency in time interval T4. When the apparatus detects TWN Mobile again, the apparatus can obtain the current utility frequency from the mapping history in time interval T5.

In time interval T6, the apparatus uses the image-based detection algorithm to obtain the current utility frequency. In the beginning of time interval T7, the apparatus detects a DC charging circuit of the apparatus. Then, the apparatus analyzes a frequency spectrum of the DC charging circuit of the apparatus to obtain the current utility frequency, 60 Hz. Next, the apparatus detects that a new telecom operator, AT&T, is currently offering telecommunications services to the apparatus. Thus, the apparatus maps the current utility frequency 60 Hz to AT&T, and updates the storage device by recording AT&T to the current utility frequency 60 Hz.

As described above, an apparatus for reducing image flicker and a related method of the exemplary embodiments of the present invention are capable of automatically mapping the utility frequency of an image capture device of an apparatus to a telecom operator which the apparatus has been connected to. Compared to continuously detecting the utility frequency by an image-based detection algorithm, the apparatus and the related method in the embodiments can easily obtain the utility frequency by referring to a mapping history, thus capable of saving more computing power and time. Moreover, the apparatus and the related method in the embodiments can activate/deactivate the image-based detection algorithm at an appropriate timing without wasting time and power on continuous or redundant detection, thus capable of saving more computing power and time. Moreover, the apparatus and the related method in the embodiments can employ different resources to obtain the utility frequency and update the mapping history accordingly, thus having high feasibility and adaptability to different operating environment and/or locations.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus capable of reducing image flicker, comprising:
a processor, configured to:
detect whether a telecom operator is currently offering a telecommunication service to the apparatus;
search a mapping history of utility frequencies from a storage device and determine whether the telecom operator is mapped to a utility frequency after detecting that the telecom operator is currently offering a telecommunication service to the apparatus;
obtain the utility frequency mapped to the telecom operator from the mapping history to be a current utility frequency after determining the utility frequency mapped to the telecom operator; and
an image capture device, coupled to the processor and configured to operate with an exposure time adjusted according to the current utility frequency,
wherein the processor is further configured to:
obtain the current frequency by one or more other resources after detecting that no telecom operator is currently offering a telecommunication service to the apparatus.

2. The apparatus as claimed in claim 1, wherein the mapping history records mapping relationships between one or more telecom operators and one or more utility frequencies.

3. The apparatus as claimed in claim 1, wherein the processor is further configured to:
update the mapping history by recording a telecom operator to be mapped to the current utility frequency obtained by the one or more other resources if it is later detected that the telecom operator offers a telecommunication service to the apparatus.

4. The apparatus as claimed in claim 1, wherein the step of obtaining the current frequency by one or more other resources comprises any of using an image-based detection algorithm to obtain the current utility frequency, using a Global Positioning System (GPS) signal received by the apparatus and a location-frequency mapping table, wherein the location-frequency mapping table records mapping relationships between locations and utility frequencies, analyzing a frequency spectrum of a DC charging circuit of the apparatus to obtain the current utility frequency, using user manual settings to obtain the current utility frequency, and querying from one or more online servers or a nearby apparatus near the apparatus to obtain the current utility frequency.

5. The apparatus as claimed in claim 1, wherein the processor is further configured to:
obtain the current frequency by one or more other resources after determining that no utility frequency is mapped to the telecom operator in the mapping history.

6. The apparatus as claimed in claim 5, wherein the processor is further configured to:
update the mapping history by recording the telecom operator to be mapped to the current utility frequency obtained by the one or more other resources.

7. The apparatus as claimed in claim 5, wherein the step of obtaining the current frequency by one or more other resources comprises any of using an image-based detection algorithm to obtain the current utility frequency, using a Global Positioning System (GPS) signal received by the apparatus and a location-frequency mapping table, wherein the location-frequency mapping table records mapping relationships between locations and utility frequencies, analyzing a frequency spectrum of a DC charging circuit of the apparatus to obtain the current utility frequency, using user manual settings to obtain the current utility frequency, and querying from one or more online servers or a nearby apparatus near the apparatus to obtain the current utility frequency.

8. A processor for use in an apparatus capable of capturing images, having capability to reduce image flicker, comprising:
a detecting circuit, configured to detect whether a telecom operator is currently offering a telecommunication service to the apparatus;
a searching circuit, configured to search a mapping history of utility frequencies from a storage device and determine whether the telecom operator is mapped to a utility frequency after detecting that the telecom operator is currently offering a telecommunication service to the apparatus, and obtain the utility frequency mapped to the telecom operator from the mapping history to be a current utility frequency after determining the utility frequency mapped to the telecom operator; and
an adjusting circuit, configured to adjust an exposure time for capturing images according to the current utility frequency,
wherein the searching circuit is further configured to:
obtain the current frequency by one or more other resources after detecting that no telecom operator is currently offering a telecommunication service to the apparatus.

9. A method for reducing image flicker of an apparatus capable of capturing images, the method comprises:
detecting whether a telecom operator is currently offering a telecommunication service to the apparatus;
searching a mapping history of utility frequencies from a storage device and determining whether the telecom operator is mapped a utility frequency after detecting that the telecom operator to be currently offering the telecommunication service to the apparatus;
obtaining the utility frequency mapped to the telecom operator from the mapping history to be a current utility frequency after determining the utility frequency is mapped to the telecom operator; and
adjusting an exposure time for capturing images according to the current utility frequency,
the method further comprises:
obtaining the current frequency by one or more other resources after detecting that no telecom operator is currently offering a telecommunication service to the apparatus.

10. The method for reducing image flicker as claimed in claim 9, wherein the mapping history records mapping relationships between one or more telecom operators and one or more utility frequencies.

11. The method as claimed in claim 10, further comprising updating the mapping history by recording a telecom operator to be mapped to the current utility frequency obtained by the one or more other resources after it is later detected that the telecom operator offers a telecommunication service to the apparatus.

12. The method as claimed in claim 9, wherein the step of obtaining the current frequency by one or more other resources comprises any of using an image-based detection algorithm to obtain the current utility frequency, using a Global Positioning System (GPS) signal received by the method and a location-frequency mapping table, wherein the location-frequency mapping table records mapping relationships between locations and utility frequencies, analyzing a frequency spectrum of a DC charging circuit of the method to obtain the current utility frequency, using user manual settings to obtain the current utility frequency, and querying from one or more online servers or a nearby method near the method to obtain the current utility frequency.

13. The method for reducing image flicker as claimed in claim 9, further comprising:
obtaining the current frequency by one or more other resources after determining that no utility frequency is mapped to the telecom operator.

14. The method for reducing image flicker as claimed in claim 10, further comprising:
updating the mapping history by recording the telecom operator to be mapped to the current utility frequency obtained by the one or more other resources.

15. The method as claimed in claim 13, wherein the step of obtaining the current frequency by one or more other resources comprises any of using an image-based detection algorithm to obtain the current utility frequency, using a Global Positioning System (GPS) signal received by the apparatus and a location-frequency mapping table, wherein the location-frequency mapping table records mapping relationships between locations and utility frequencies, analyzing a frequency spectrum of a DC charging circuit of the apparatus to obtain the current utility frequency, using user manual settings to obtain the current utility frequency, and querying from one or more online servers or a nearby apparatus near the apparatus to obtain the current utility frequency.

16. A method for reducing image flicker of an apparatus capable of capturing images, the method comprises:
detecting whether a telecom operator is currently offering a telecommunication service to the apparatus; and
in events where a telecom operator is detected to be currently offering a telecommunication service to the apparatus, obtaining a utility frequency mapped to the telecom operator from previously-stored mapping information, wherein the utility frequency is provided for adjusting an exposure time of an image capturing device according to the utility frequency,
wherein the method further comprises:
obtaining the current frequency by one or more other resources after detecting that no telecom operator is currently offering a telecommunication service to the apparatus.

17. The method for reducing image flicker as claimed in claim 16, further comprising updating the mapping information using a utility frequency obtained by one or more other resources.

18. A non-transitory computer-readable storage medium comprising one or more programs configured to be executed by one or more processors of an apparatus capable of capturing images, having capability to reduce image flicker, the one or more programs comprising instructions for:
detecting whether a telecom operator is currently offering a telecommunication service to the apparatus;
searching a mapping history of utility frequencies from a storage device and determine whether the telecom operator is mapped to a utility frequency after detecting that the telecom operator is currently offering a telecommunication service to the apparatus, and obtain the utility frequency mapped to the telecom operator from the mapping history to be a current utility frequency after determining the utility frequency mapped to the telecom operator; and
adjusting an exposure time for capturing images according to the current utility frequency,
wherein the one or more programs further comprises instructions for:
obtaining the current frequency by one or more other resources after detecting that no telecom operator is currently offering a telecommunication service to the apparatus.

* * * * *